(No Model.) 2 Sheets—Sheet 1.

A. KLEINSTIVER.
MECHANISM FOR DRIVING MACHINERY.

No. 429,134. Patented June 3, 1890.

Attest
W. Edmunds
Carl Hayden

Inventor
Abel Kleinstiver
By P. J. Edmunds
Atty (No Model.) 2 Sheets—Sheet 2.

A. KLEINSTIVER.
MECHANISM FOR DRIVING MACHINERY.

No. 429,134. Patented June 3, 1890.

Attest
A. Edmunds
Carl Hayden

Inventor
Abel Kleinstiver
By P. J. Edmunds
Atty

UNITED STATES PATENT OFFICE.

ABEL KLEINSTIVER, OF PETROLIA, ONTARIO, CANADA, ASSIGNOR OF ONE-HALF TO B. S. VAN TUYL, OF SAME PLACE.

MECHANISM FOR DRIVING MACHINERY.

SPECIFICATION forming part of Letters Patent No. 429,134, dated June 3, 1890.

Application filed June 5, 1888. Serial No. 276,150. (No model.)

*To all whom it may concern:*

Be it known that I, ABEL KLEINSTIVER, a subject of the Queen of Great Britain, and a resident of Petrolia, in the county of Lambton, in the Province of Ontario, Canada, have invented certain new and useful Improvements in Mechanism for Driving Machinery, of which the following specification, taken in connection with the accompanying drawings, forms a full, clear and exact description.

This invention relates to an improved train of gearing for operating the shafts and cylinder and drum of a thrashing-machine or the operating-shaft of any other machine connected with said gearing, the object being to equalize the strain of the gear on the shaft of the operated machine, and thereby prevent the shaft from heating or wearing on one side, as will be hereinafter first fully set forth and described, and then pointed out in the claims.

Figure 2:
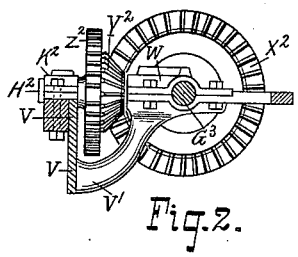
Figure 1:
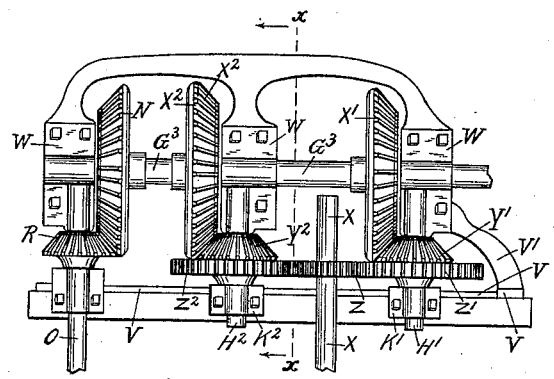
Figure 3:
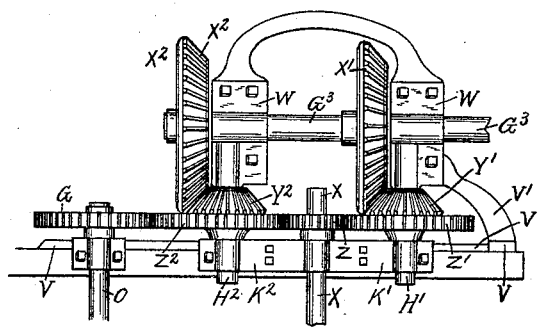

Reference is to be had to the accompanying drawings, wherein Figure 1 is a plan view of my improved gearing. Fig. 2 is a side elevation of same, partly in section, on the line $x$ $x$ of Fig. 1. Fig. 3 shows a modification of my improved gear.

$G^3$ is a shaft, which is held in place by and revolves perfectly free in bearings W, secured either to the brackets V', plate V, or frame of the machine, and this shaft $G^3$ may be operated by any suitable means.

X' X² are beveled gear-wheels, rigidly secured on said shaft $G^3$, which mesh and engage with the beveled gear-pinions Y' Y², rigidly secured on the shafts H' H², the latter being held in place at one end by and revolving perfectly free in bearings K' K², and at the other by bearings W, and Z' Z² are toothed wheels, also rigidly secured on the shafts H' H². Each of these toothed wheels Z' Z² engages with the toothed pinion Z, rigidly secured on the shaft X. This would preferably be the cylinder-shaft of a thrashing-machine, so that as the shaft $G^3$ is operated the shaft X, as well as the cylinder of a thrashing-machine, or other part of any other machine connected with the shaft X, is also operated.

N designates a beveled gear, also rigidly secured to the shaft $G^3$, which engages with a beveled pinion R, rigidly secured on the shaft O. This would be the drum-cylinder shaft of a thrashing-machine, so that as the shaft $G^3$ was operated the shaft O, as well as the drum-cylinder of a thrashing-machine or other part of any other machine connected with the shaft O, is also operated.

By forming the gear double, as just described—that is, to engage with the shaft X at two sides—the strain of the gear on said shaft X is equalized on each side, and thereby prevents friction, heating, or wearing of said shaft X on one side, which is the case when only a single gear is used to operate said shaft X; and, further, a double gear is stronger, because the engagement with the shaft X is at two points, and thereby increases the leverage. At the same time, double the number of teeth are in mesh, and by using the beveled gear-wheel N and pinion R to operate the shaft O the latter, as well as the whole of the machine, is more certain of operation, especially when opposed to great resistance, and when operating the shaft O of the drum-cylinder of a thrashing-machine the straw is prevented from winding around the drum-cylinder, which has been found to be the case where this drum-cylinder has been operated by a belt. The advantages gained by using this gear are that it will give a regular steady motion to the whole machine. The result of this is that there will be no check or stoppage of any part of the machine, and in a thrashing-machine, even when the grain is fed to it irregularly by reason of this steady continuous operation, a saving of at least thirty per cent. in the separating and cleaning of the grain over those machines to which motion is communicated by belting from the engine to the drum-cylinder.

In Fig. 3 a modification of my invention is shown wherein motion is communicated to the shaft O by a toothed wheel G on said shaft engaging with the toothed wheel Z².

Having thus described my invention, I claim—

1. The combination of the shaft $G^3$, bearings W, brackets V', beveled gear-wheels X' X², beveled pinions Y' Y², toothed wheels Z' Z², and shafts H' H² with the toothed pinion Z and shaft X, substantially as and for the purpose set forth.

2. The shaft G³, bearings W, beveled gear-wheels X' X², and beveled pinions Y' Y², toothed wheels Z' Z², shafts H' H², toothed pinions Z, and shaft X, in combination with the toothed wheel and shaft O, substantially as and for the purpose set forth.

In testimony whereof I affix my signature in the presence of the two undersigned witnesses.

ABEL KLEINSTIVER.

Witnesses:
P. J. EDMUNDS,
A. EDMUNDS.